(12) United States Patent
Alakarhu

(10) Patent No.: US 8,836,814 B2
(45) Date of Patent: Sep. 16, 2014

(54) METHOD AND APPARATUS FOR AMBIENT LIGHT SPECTRUM DETECTION IN DIGITAL PHOTOGRAPHY

(75) Inventor: Juha Heikki Alakarhu, Helsinki (FI)

(73) Assignee: Nokia Corporation, Espoo (FI)

( * ) Notice: Subject to any disclaimer, the term of this patent is extended or adjusted under 35 U.S.C. 154(b) by 122 days.

(21) Appl. No.: 13/352,708

(22) Filed: Jan. 18, 2012

(65) Prior Publication Data

US 2013/0182153 A1    Jul. 18, 2013

(51) Int. Cl.
  *H04N 9/73* (2006.01)
  *H04N 9/083* (2006.01)
  *H04N 3/14* (2006.01)
  *H04N 5/335* (2011.01)
  *H04N 9/04* (2006.01)

(52) U.S. Cl.
  USPC .................................... 348/223.1; 348/273

(58) Field of Classification Search
  USPC ...................................... 348/223.1, 370–371
  See application file for complete search history.

(56) References Cited

U.S. PATENT DOCUMENTS

| 5,936,684 | A | 8/1999 | Murayama | 348/673 |
| 6,839,088 | B2* | 1/2005 | Dicarlo et al. | 348/370 |
| 7,960,807 | B2* | 6/2011 | Lin et al. | 257/440 |
| 2002/0196972 | A1 | 12/2002 | Bayramoglu et al. | 382/167 |
| 2003/0169347 | A1* | 9/2003 | Jenkins | 348/222.1 |
| 2003/0169354 | A1 | 9/2003 | Aotsuka | 348/272 |
| 2009/0002545 | A1* | 1/2009 | Heinonen et al. | 348/370 |
| 2009/0321865 | A1 | 12/2009 | Kasano et al. | 257/432 |
| 2011/0090379 | A1 | 4/2011 | Koizumi | 348/242 |
| 2011/0221954 | A1* | 9/2011 | Staller | 348/362 |
| 2011/0285895 | A1* | 11/2011 | Weng et al. | 348/340 |
| 2011/0292239 | A1* | 12/2011 | Gilbert-Schachter et al. | 348/224.1 |
| 2012/0092541 | A1* | 4/2012 | Tuulos et al. | 348/333.01 |
| 2012/0147243 | A1* | 6/2012 | Townsend et al. | 348/333.02 |

FOREIGN PATENT DOCUMENTS

JP    2008136251 A    6/2008
WO    WO 2010/028231 A1    3/2010

* cited by examiner

*Primary Examiner* — Kelly L Jerabek
(74) *Attorney, Agent, or Firm* — Harrington & Smith

(57) ABSTRACT

Digital camera or device with a digital camera unit is controlled in a process in which light spectrum power distribution is detected by a detector that has a plurality of narrow-band photo-electric sensors at locations spaced apart on an image capture unit of a digital camera unit. Each sensor has a given sensitive bandwidth within the frequency range of visible light. The number of the sensitive bandwidths is N that is greater than 3. A signal indicative of the light spectrum power distribution as detected by the detector is produced.

18 Claims, 4 Drawing Sheets

Fig. 5

| R | G | R | G | R | G | R | G | R | G | R | G | R | G |
|---|---|---|---|---|---|---|---|---|---|---|---|---|---|
| B | 0 | B | G | B | G | B | 1 | B | G | B | G | B | 2 |
| R | G | R | G | R | G | R | G | R | G | R | G | R | G |
| B | G | B | G | B | 3 | B | G | B | G | B | 4 | B | G |
| R | G | R | G | R | G | R | G | R | G | R | G | R | G |
| B | G | B | 5 | B | G | B | G | B | 6 | B | G | B | G |
| R | G | R | G | R | G | R | G | R | G | R | G | R | G |
| B | 7 | B | G | B | G | B | 8 | B | G | B | G | B | 9 |
| R | G | R | G | R | G | R | G | R | G | R | G | R | G |
| B | G | B | G | B | 0 | B | G | B | G | B | 1 | B | G |
| R | G | R | G | R | G | R | G | R | G | R | G | R | G |
| B | G | B | 2 | B | G | B | G | B | 3 | B | G | B | G |
| R | G | R | G | R | G | R | G | R | G | R | G | R | G |
| B | 4 | B | G | B | G | B | 5 | B | G | B | G | B | 6 |
| R | G | R | G | R | G | R | G | R | G | R | G | R | G |
| B | G | B | G | B | 7 | B | G | B | G | B | 8 | B | G |
| R | G | R | G | R | G | R | G | R | G | R | G | R | G |
| B | G | B | 9 | B | G | B | G | B | 0 | B | G | B | G |

METHOD AND APPARATUS FOR AMBIENT LIGHT SPECTRUM DETECTION IN DIGITAL PHOTOGRAPHY

TECHNICAL FIELD

The present application generally relates to ambient light spectrum detection in digital photography.

BACKGROUND

In digital photography, images are typically formed by passing light from an object through an objective and infrared (IR) filter onto an image sensor or image capture unit such as a CMOS or CCD unit. The image capture unit typically comprises some millions of pixel sensing elements for forming corresponding pixels of digital images. Interlaced grids of red, green and blue pixel sensing elements form respectively colored pixels. Simply said, digital photography forms a brightness map of red, green and blue pixels evenly distributed throughout an image. In optimal conditions, the ambient light that illuminates the target is sunlight filtering through clouds so that the target is evenly illuminated by white light i.e. light that has an even visible light spectrum. Thus, the colors of the target can be accurately recorded by storing brightness values corresponding to signals produced by the different pixel sensing elements. However, often pictures are taken of targets illuminated by artificial light. Unfortunately, most artificial lights have a spectrum that significantly differs from natural light produced by the sun. Thus, the color spectrum of the image becomes biased and particularly the skin of people may appear unnatural to human eye. A vast number of different techniques are developed to address this problem. For example, the average or total brightness recorded can be calculated for all three different-colored pixel sensing elements and their balance can be used to deduce the probable source of light.

SUMMARY

Various aspects of examples of the invention are set out in the claims.

According to a first example aspect of the present invention, there is provided an apparatus, comprising:

a light spectrum power distribution detector comprising a plurality of narrow-band photo-electric sensors;

wherein the sensors each have a given sensitive bandwidth within the frequency range of visible light, the number of the sensitive bandwidths being N, wherein N is greater than 3;

wherein the sensors are spaced apart on an image capture unit of a digital camera unit; and wherein the apparatus further comprises an output configured to output a signal indicative of the light spectrum power distribution as detected by the detector.

A plurality of the sensors may share a common sensitive bandwidth.

The sensors may be spread across the image capture unit. The sensors may be evenly spread across the image capture unit. Alternatively, the sensors may be spread across the image capture unit with varying spacing.

The sensors may be laid on the image capture unit. Alternatively, the sensors may be supported in front of the image capture unit separately from the image capture unit. The sensors may supported by a transparent layer arranged onto an optical path leading to the sensor from an objective of the digital camera unit.

The sensors may be configured to enable detection of the light spectrum power distribution within wavelength bands smaller or equal to X nanometers. X may be selected from a group consisting of 1, 5, 10, 15, 20, 25, 30, 35, 40, 45 or 50. X need not be an integer or a multiple of five.

N may be 5 to 50. For instance, N may be 8, 16, 20, 25, 30 or 32.

The sensitive bandwidths may be consecutive. The sensitive bandwidths may collectively cover the entire frequency range of the visible light.

The sensitive bandwidths may cover non-continuous parts of the entire frequency range of the visible light. The sensitive bandwidths may be set at such parts of the frequency range of the visible light where characteristic spectrum power peaks of particular illuminants reside.

The frequency range of the visible light may refer to the frequency range over which the image capture unit is operable.

The sensitive bandwidths may be equally wide or of different widths.

The sensitive bandwidths may range from 400 nm to 700 nm.

The sensors may be aligned with or in place of given picture sensing elements of the image capture unit. The picture sensing elements of the image capture unit may be arranged in groups of four in which there are two picture sensing elements sensitive for a first color and two other picture sensing elements each sensitive for second and third colors such that each group is capable of producing signals corresponding to three different colors. Most or all of the sensors may be aligned with the picture sensing elements for the first color.

The sensors of common sensitive bandwidth may be evenly distributed across the image capture unit.

The image capture unit may comprise a margin region and a central region such that only the central region produces images for the user of the apparatus. The margin region may be configured for providing feedback information for digital image stabilization. The sensors may reside at the margin region, or the sensors may be more densely arranged in the margin region than at the central region.

The sensors may be formed of individual picture sensing elements of the image capture unit. Each of the individual picture sensing elements may be equipped with a filter configured to pass light only in the sensitive bandwidth of an associated picture sensing element.

The apparatus may further comprise a defective picture sensing element memory for neglecting of signals from defective picture sensing elements. The defective picture sensing element memory may be configured to mark as defective picture sensing elements the picture sensing elements that used as or aligned with any of the sensors.

The apparatus may comprise $M_k$ sensors for each sensitive bandwidth denoted as bandwidthk, wherein k is 1 to N. $M_k$ may be greater than 1 for each value of k or for each sensitive bandwidth. Moreover, $M_k$ may be constant for each value of k. The number of the sensors may be the sum of each $M_k$, wherein k is 1 to N.

The number of the sensors may be selected from a group consisting of: greater than 5 to 10 per sensitive bandwidth, greater than 100, or a given percentage of picture sensing elements in the image capture unit. The given percentage may be e.g. 0.1 percent or 0.05 to 0.5 percent.

The apparatus may comprise an analyzer configured to determine what type of an illuminant is the source of light that arrives at the detector.

The analyzer may comprise a memory storing fingerprint characteristics of different illuminant types. The fingerprint characteristics may comprise one or more spectrum power distribution feature such as dominant wavelengths and/or spectrum power portion at dominant wavelengths.

The analyzer may be configured to determine the types of more than one concurrently operating illuminants that are the sources of the light that arrives at the detector. Each illuminant with a contribution exceeding a given illuminant threshold may be determined. The illuminant threshold may be set e.g. such that another illuminant is only determined if the share of the illuminant's light in the illumination exceeds 20 to 40 percent.

The apparatus may be configured to update the stored fingerprint characteristics.

The analyzer may be configured to determine the type of the illuminant based on signals produced by the picture sensing elements over a period of time. The period of time may correspond to the time over which changes in the signals produced by the picture sensing elements have remained within a predetermined window.

The analyzer may be configured to compensate for biasing caused by generic coloring of imaging objects. The compensating may comprise comparing signals produced by individual sensors to signals corresponding to broader bandwidth of light arriving at the image capture unit. Picture sensing elements not used as the sensors may be used by the analyzer to provide the signals corresponding to the broader bandwidth of light.

The analyzer may be configured to determine color shade correction parameters for compensating uneven spectrum power distribution in images produced by the image capture unit.

The apparatus may store images in image files without performing color shade correction and contain in the image files the color shade correction parameters for subsequent correction. The image files may be stored in a raw format in which no image compression is performed. In the raw format, pixels of the image may be represented with the bit depth that is natively provided by the image capture unit. The apparatus may be configured to correct viewfinder images using the color shade correction parameters while images are stored in the raw format.

According to a second example aspect of the present invention, there is provided a method comprising:
detecting light spectrum power distribution by a detector comprising a plurality of narrow-band photo-electric sensors at locations spaced apart on an image capture unit of a digital camera unit, each sensor having a given sensitive bandwidth within the frequency range of visible light; and
producing a signal indicative of the light spectrum power distribution as detected by the detector;
wherein the number of the sensitive bandwidths is N and N is greater than 3.

According to a third example aspect of the present invention, there is provided a system comprising the apparatus of the first example aspect and a remote illuminant feature database.

The remote illuminant feature database may comprise one or more characteristic for each of various types of illuminants. The illuminant feature database may comprise for each of the various types of illuminants a name of the type of illuminant. The illuminant feature database may comprise for each of the various types of illuminants a unique identifier. The unique identifier may enable updating of illuminant features earlier stored by the apparatus for a given type of illuminant so as to avoid undesired expanding of a local collection of illuminant features stored at the apparatus.

The analyzer may reside at a remote server. The apparatus may be configured to determine one or more characteristics of the light spectrum power distribution and send the determined characteristics to the remote server for analyzing based on the characteristics stored in the feature database. The apparatus may receive color shade correction parameters from the remote server.

According to a fourth example aspect of the present invention, there is provided a computer program comprising computer executable program code, configured to cause an apparatus, when executing the program code, to perform the method of the second aspect.

According to a fifth example aspect of the present invention, there is provided a computer readable memory medium storing the computer program of the third example aspect.

According to a sixth example aspect of the present invention, there is provided a data structure comprising a photograph image defined by a plurality of color picture elements representing at least three different colors and color shade compensation parameters for compensating color shade errors caused by uneven spectrum of light used when the image was taken.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

According to a seventh example aspect of the present invention, there is provided an apparatus, comprising:
detecting means for detecting a light spectrum power distribution comprising a plurality of narrow-band photo-electric sensor means;
wherein the sensor means each have a given sensitive bandwidth within the frequency range of visible light, the number of the sensitive bandwidths being N, wherein N is greater than 3;
wherein the sensor means are spaced apart on an image capture unit of a digital camera unit; and
wherein the apparatus further comprises an output means for outputting a signal indicative of the light spectrum power distribution as detected by the detecting means.

According to an eighth example aspect of the present invention, there is provided an apparatus, comprising:
a processor configured to:
detecting light spectrum power distribution by a detector comprising a plurality of narrow-band photo-electric sensors at locations spaced apart on an image capture unit of a digital camera unit, each sensor having a given sensitive bandwidth within the frequency range of visible light; and
producing a signal indicative of the light spectrum power distribution as detected by the detector;
wherein the number of the sensitive bandwidths is N and N is greater than 3.

Different non-binding example aspects and embodiments of the present invention have been illustrated in the foregoing. The above embodiments are used merely to explain selected aspects or steps that may be utilized in implementations of the present invention.

Some example embodiments of the invention may be presented only the detailed description of this document or in this summary, and/or only with reference to certain example aspects of the invention. It should be appreciated that embodiments relating to one example aspect or one embodiment may apply to other example aspects or embodiments as well.

BRIEF DESCRIPTION OF THE DRAWINGS

For a more complete understanding of example embodiments of the present invention, reference is now made to the following descriptions taken in connection with the accompanying drawings in which:

FIG. 5 shows a schematic view of a surface of an image capture unit of an example embodiment of the invention;

DETAILED DESCRIPTION OF THE DRAWINGS

An example embodiment of the present invention and its potential advantages are understood by referring to FIGS. 1 through 6 of the drawings.

Various examples will next be described to illustrate different example embodiments of the invention. The structures of these embodiments may be varied in many ways and it makes the description simpler and clearer to first present a basic system in which the embodiments are described, then discuss various operations according to different example embodiments and finally explain various structures with which these operations can be implemented.

Figure 1:
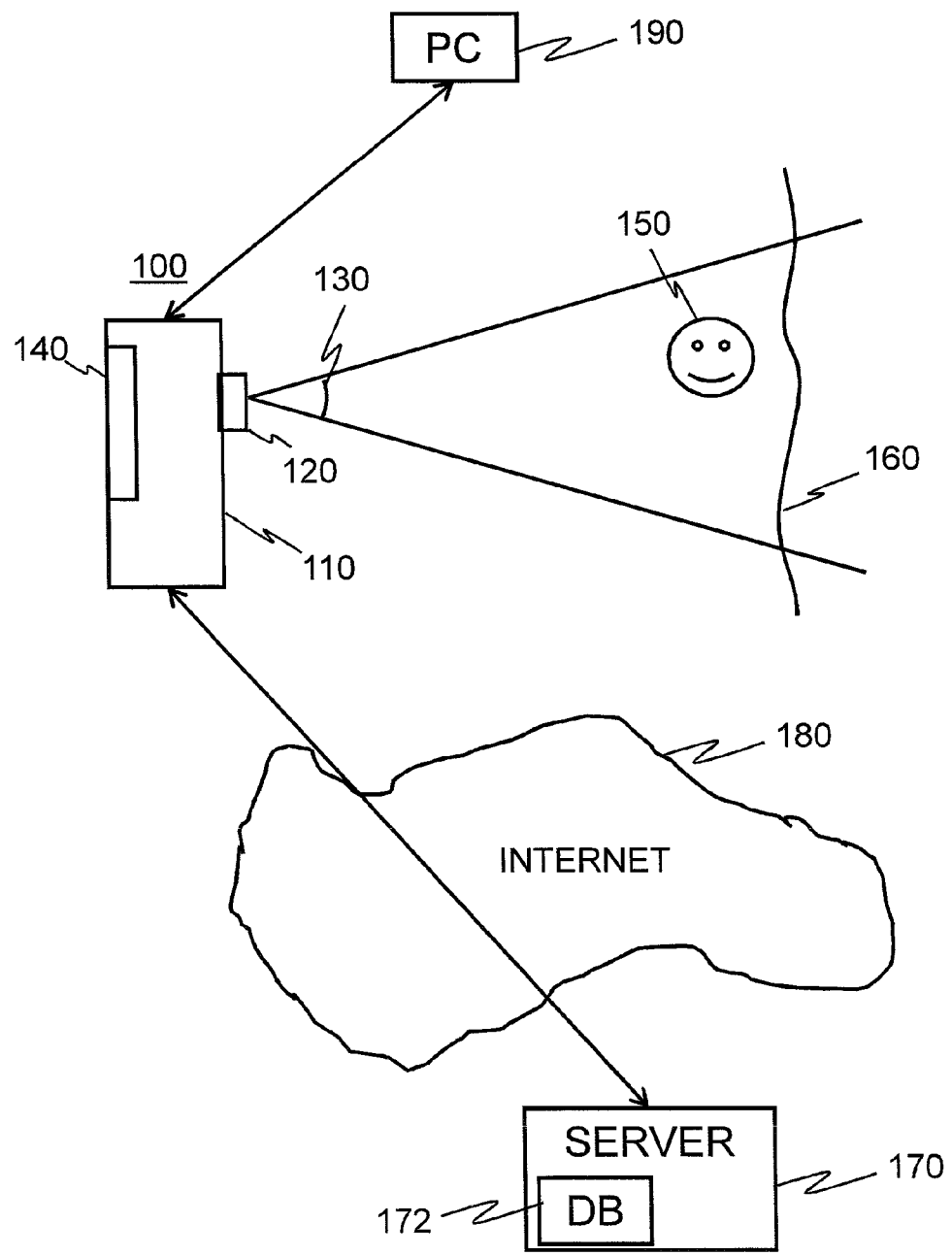
FIG. 1 shows a schematic system for use as a reference with which some example embodiments of the invention can be explained.

FIG. 1 shows a schematic system 100 for use as a reference with which some example embodiments of the invention can be explained. The system 100 comprises a device 110 such as a camera phone, gaming device, security camera device, personal digital assistant or a digital camera having a camera unit 120 with a field of view 130. The device 110 further comprises a display 140. FIG. 1 also shows an image object 150 that is being imaged by the camera unit 120 and a background 160 such as a curtain behind the image object. The device 110 is also able to communicate with a server 170 that comprises an illuminant characteristics database 172 i.e. fingerprints of different types of illuminants in one example embodiment. The connection between the device 110 and the server 170 is formed directly or through a data network 180 such as the Internet. FIG. 1 further shows external equipment 190 such as a personal computer or image processing station that is configured to receive images from the device 100 and to use or process the images.

In FIG. 1, the image object 150 is small and next to the image object 150, there is a continuous background 160. While this setting is not by any means necessary, it serves to simplify FIG. 1 and description of some example embodiments of the invention.

That the image is small in relation to the field of view 130 of the device 110 results in that the light that arrives in the camera unit 120 is mostly reflected by the background. The entire concept of seeing colors and photographing them is based on the fact that objects of given color emphasize or color some frequencies of visible light on reflecting light. Now, as explained in the opening part of this document, the camera unit 120 should know the white balance of the ambient light in order to produce images of correct color shades. Moreover, it is recognized by the inventor that it is not sufficient to know the color temperature of the ambient light, as the ambient light may comprise very strong and narrow peaks in its spectrum power distribution. Hence, the spectrum power distribution of the light arriving at the camera unit 120 is determined in an example embodiment by measuring the light spectrum power distribution with a plurality of narrow-band photo-electric sensors (520 in FIG. 5) so that the light spectrum power is measured at N different sensitive bandwidths, wherein N is greater than 3, e.g. 30 (with 10 nm bands from wavelengths of 400 nm to 700 nm). Term narrow-band refers, in one example embodiment, to a bandwidth that is narrow enough to distinguish different artificial illuminants from one another by distinguishing their characteristic local spectrum power distribution maxima.

In the following, the narrow-band photo-electric sensors are also referred to as sensors in sake of brevity. It should also be understood that wavelength and frequency each are equally applicable for describing particular range of light rays of different colors. In sake of simplicity, this document may refer to frequencies with given wavelengths or bands of light with a range of wavelengths; either expression is clear and unambiguous for a skilled person.

The spectrum power distribution of light at the camera unit 120 varies depending on the color of the surface of which the images are formed and on light that illuminates that particular surface. Thus, an image capture unit of the camera unit 120 experiences different spectra at different parts of images. To this end, in an example embodiment, the sensors (520 in FIG. 5) are spaced apart on the image capture unit so that various different parts of the images are measured. In an example embodiment, the sensors are spaced apart the sensors such that at least most of the sensors are not adjacent with another sensor.

The narrow-band photo-electric sensors 520 can be implemented in different ways according to different example embodiments of the invention. For example, in some image capture units, the pixel sensing elements each comprise matching electric circuitry for converting light power into electric signals. Different operating bands are arranged by placement of corresponding optical filters onto the optical path in front of the pixel sensing elements. Such optical filters can be, for instance, pieces of colored glass or plastics. The sensors 520 can be simply produced by using suitable optical filters. In this case, the electronic circuitry can be produced as before, for instance by using ordinary charge coupled device (CCD) or complementary metal oxide semiconductor (CMOS) circuitries.

In an example embodiment, the sensors 520 are configured by adapting the circuitry in the image capture units 120. For instance, sensitivity range of semiconductor detector can be configured by adjusting spacing such that the sensors inherently gain desired frequency bands. There are also image capture units in which there are layered arrays of pixel sensing elements, separating light via the inherent wavelength-dependent absorption property of silicon, such that every location senses three color channels used for generation of images. Such an image capture unit is adapted in an embodiment to further provide the sensors 520.

Averaging over a number of different images can be used. For instance, let us consider the process of taking a portrait image of a person. Normally, the camera unit 120 is first switched on so that the device 110 is located at a distance of the eyes of the user for gaining sight at controls of the device 110. When the camera unit 120 starts up, it begins to form images. Now, the first images of the camera unit 120 have a different field of view 130. The camera unit 120 is then aimed at the desired image object 150. All this time, the camera unit 120 has its image capture unit activated and forms images onto the display 140 that operates as a viewfinder. While the images shown on the viewfinder need not be stored anywhere, the device 110 can be used all this time for the detection of the light spectrum power distribution. As the field of view 130 changes, the representation of ambient light is improved and the detection of the type of the illuminant can become more accurate than if deduced only with one field of view 130.

It is appreciated that in sake of simplicity, this document mostly discusses the situation in which the ambient light originates from a single type of an illuminant, such as a fluorescent lamp, a halogen lamp, an incandescent lamp, or sunshine whether directly or through clouds. However, the ambient light can originate from two or more sources. In an example embodiment, each ambient light source or illuminant with a contribution exceeding a given illuminant threshold is determined. This illuminant threshold is used to simplify processing and it can alternatively be omitted. When used, the illuminant threshold can be set e.g. such that another illuminant is only determined if its share in the illumination exceeds 20 to 40 percent. Another illuminant is only determined if its impact on the color shade of images is likely to be significant.

Figure 2:
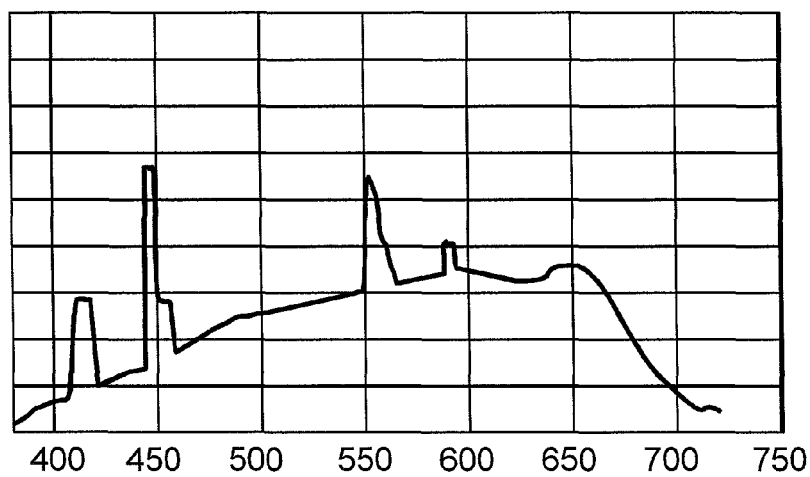
FIG. 2 shows a schematic graph of light spectrum power distribution in light reflected from white surface under particular artificial illumination.

FIG. 2 shows a schematic graph of light spectrum power distribution in light reflected from white surface under particular artificial illumination.

Figure 3:
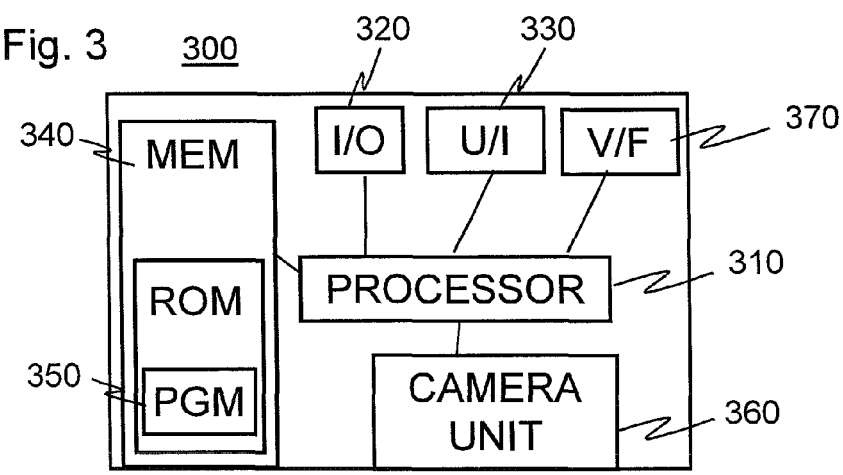
FIG. 3 shows a block diagram of an apparatus of an example embodiment of the invention.

FIG. 3 shows a block diagram of an apparatus 300 of an example embodiment of the invention. The apparatus 300 is suited for operating as the device 110. The apparatus 300 comprises a communication interface 320, a processor 310 coupled to the communication interface module 320, and a memory 340 coupled to the processor 310. The memory 340 comprises a work memory and a non-volatile memory such as a read-only memory, flash memory, optical or magnetic memory. In the memory 340, typically at least initially in the non-volatile memory, there is stored software 350 operable to be loaded into and executed by the processor 310. The software 350 may comprise one or more software modules and can be in the form of a computer program product that is software stored in a memory medium. The apparatus 300 further comprises a camera unit 360 and a viewfinder 370 each coupled to the processor.

It shall be understood that any coupling in this document refers to functional or operational coupling; there may be intervening components or circuitries in between coupled elements.

The communication interface module 320 is configured to provide local communications over one or more local links. The links may be wired and/or wireless links. The communication interface 320 may further or alternatively implement telecommunication links suited for establishing links with other users or for data transfer (e.g. using the Internet). Such telecommunication links may be links using any of: wireless local area network links, Bluetooth, ultra-wideband, cellular or satellite communication links. The communication interface 320 may be integrated into the apparatus 300 or into an adapter, card or the like that may be inserted into a suitable slot or port of the apparatus 300. While FIG. 3 shows one communication interface 320, the apparatus may comprise a plurality of communication interfaces 320.

The processor 310 is, for instance, a central processing unit (CPU), a microprocessor, a digital signal processor (DSP), a graphics processing unit, an application specific integrated circuit (ASIC), a field programmable gate array, a microcontroller or a combination of such elements. FIG. 3 shows one processor 310, but the apparatus 300 may comprise a plurality of processors. For instance, in an example embodiment, the apparatus 300 comprises a dedicated imaging processor that is optionally incorporated in a camera module with the image capture unit 120. The imaging processor of this embodiment takes care of determining spectrum power distribution based on signals produced by the sensors 520 and possibly also of using color shade correction parameters produced by the imaging processor or another entity. This using may involve, for example, furnishing the parameters in raw formatted images or adjusting color values of pixels in images taken by the image capture unit 120.

The adjusting of the color values takes place either on-the-fly while images are being taken or after the images are taken. The adjusting can also be done in some embodiments as post-processing with the external equipment 190. The external equipment 190 is in an example a personal computer working with raw formatted images or compressed images when the external equipment is furnished with the color shade correction parameters. These parameters can be furnished e.g. by containing them in the image files or by use of an out-band mechanism. In an example embodiment, the device 100 is configured to transfer the color shade correction parameters to the external equipment using a wireless or wired local link.

As mentioned in the foregoing, the memory 340 may comprise volatile and a non-volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. In some example embodiments, only volatile or non-volatile memory is present in the apparatus 300. Moreover, in some example embodiments, the apparatus comprises a plurality of memories. In some example embodiments, various elements are integrated. For instance, the memory 340 can be constructed as a part of the apparatus 300 or inserted into a slot, port, or the like. Further still, the memory 340 may serve the sole purpose of storing data, or it may be constructed as a part of an apparatus serving other purposes, such as processing data. Similar options are thinkable also for various other elements.

A skilled person appreciates that in addition to the elements shown in FIG. 3, the apparatus 300 may comprise other elements, such as microphones, displays, as well as additional circuitry such as further input/output (I/O) circuitries, memory chips, application-specific integrated circuits (ASIC), processing circuitry for specific purposes such as source coding/decoding circuitry, channel coding/decoding circuitry, ciphering/deciphering circuitry, and the like. Additionally, the apparatus 300 may comprise a disposable or rechargeable battery (not shown) for powering the apparatus when external power if external power supply is not available.

It is also useful to realise that the term apparatus is used in this document with varying scope. In some of the broader claims and examples, the apparatus may refer to only a subset of the features presented in FIG. 3 or even be implemented without any one of the features of FIG. 3. In one example embodiment term apparatus refers to the processor 310, an input line of the processor 310 configured to receive information from the camera unit and an output line of the processor 310 configured to provide information to the viewfinder.

Figure 4:
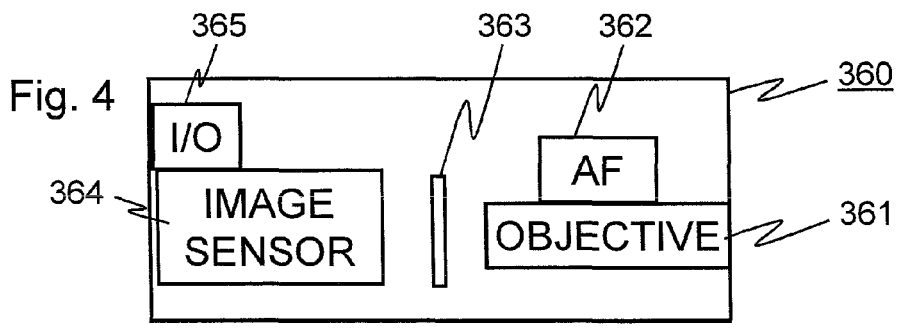
FIG. 4 shows a block diagram of a camera unit of an example embodiment of the invention.

FIG. 4 shows a block diagram of a camera unit 360 of an example embodiment of the invention. The camera unit 360 comprises an objective 361, an autofocus unit 362 configured to adjust focusing of the objective 361, an optional mechanical shutter 363, an image capture unit 364 and an input and/or output 365. The camera unit 360 is configured in one example embodiment to output autofocus information from the autofocus unit 362. In one example embodiment, the camera unit is also configured to receive through the I/O 365 instructions for the autofocus unit 362.

FIG. 5 shows a schematic view of a surface 500 of an image capture unit of an example embodiment of the invention. On the surface 500 of the image capture unit there are interlaced grids of pixel sensing elements 512, 514 & 518 and 516 for producing red, green and blue pixels, respectively. As shown in FIG. 5, the pixel sensing elements are arranged into groups 510 of four pixel sensing elements. In each group 510, there are two pixel sensing elements 514, 518 for producing green pixels, except for groups where one green pixel sensing element 518 is replaced by a narrow-band photo-electric sensor 520.

The pixel sensing elements that are used as sensors 520 are, in one example embodiment, marked as defective pixel sensing elements. This marking is recorded into a memory such as non-volatile part of the memory 340. Such marking enables otherwise normal processing of the image capture unit; images can be formed using signals from all such pixel sensing elements that are not marked as defective. It is also noticed in this context that as shown by FIG. 5, the sensors 520 are relatively close to each other because they are drawn for illustrational reasons in place of every 12th pixel sensing element. Considering that in an example embodiment every 1000th pixel sensing element is used as a sensor 520, the degradation caused on digital images is negligible. With image capture units' resolutions growing greater, e.g. beyond 20 or 40 Mpixels, the use of some hundreds or even thousands of pixels is hard if even possible to notice in normal use whereas the possible improvement in color shading correction may be perceived by users as a striking advancement.

In FIG. 5, there are narrow-band photo-electric sensors 520 in every second or third group 510 i.e. the sensors 520 are evenly spread across image capture unit and/or the sensors 520 are not in common plane or unit with the pixel sensing elements. Moreover, the narrow-band photo-electric sensors 520 can be evenly distributed on some region or regions of the surface 500 and unevenly distributed on some other region or regions of the surface 500.

In another example embodiment, there are far fewer narrow-band photo-electric sensors 520 than FIG. 5 suggests (when extrapolated to millions of pixels). In yet another example embodiment, there are as many or more narrow-band photo-electric sensors 520 than in FIG. 5.

In FIG. 5, there are 10 different types of narrow-band photo-electric sensors 520 labeled as 0 to 9. With a wave length range of 400 nm to 700 nm, the narrow-band photo-electric sensors 520 can have, for instance, consecutive 30 nm wide bandwidths. The choice of 10 in FIG. 5 is simply made in sake of simplicity. With ten different types of, a reasonable sized drawing can demonstrate how the sensors 520 of given type can be spread around the surface 500 of the image capture unit. The sensors 520 can be arranged such that sensors 520 of one bandwidth do not fall onto same columns. The number of different types of sensors 520, spacing of the sensors 520 and/or the order of the sensors 520 can be varied so that sensors 520 of each bandwidth are generally spread around the surface 500.

While FIG. 5 shows all the sensors 520 at a second green pixel sensing elements 518, in another example embodiment, the sensors 520 are located on the first green pixel sensing elements 514 and/or on other pixel sensing elements 512, 516.

Figure 6:
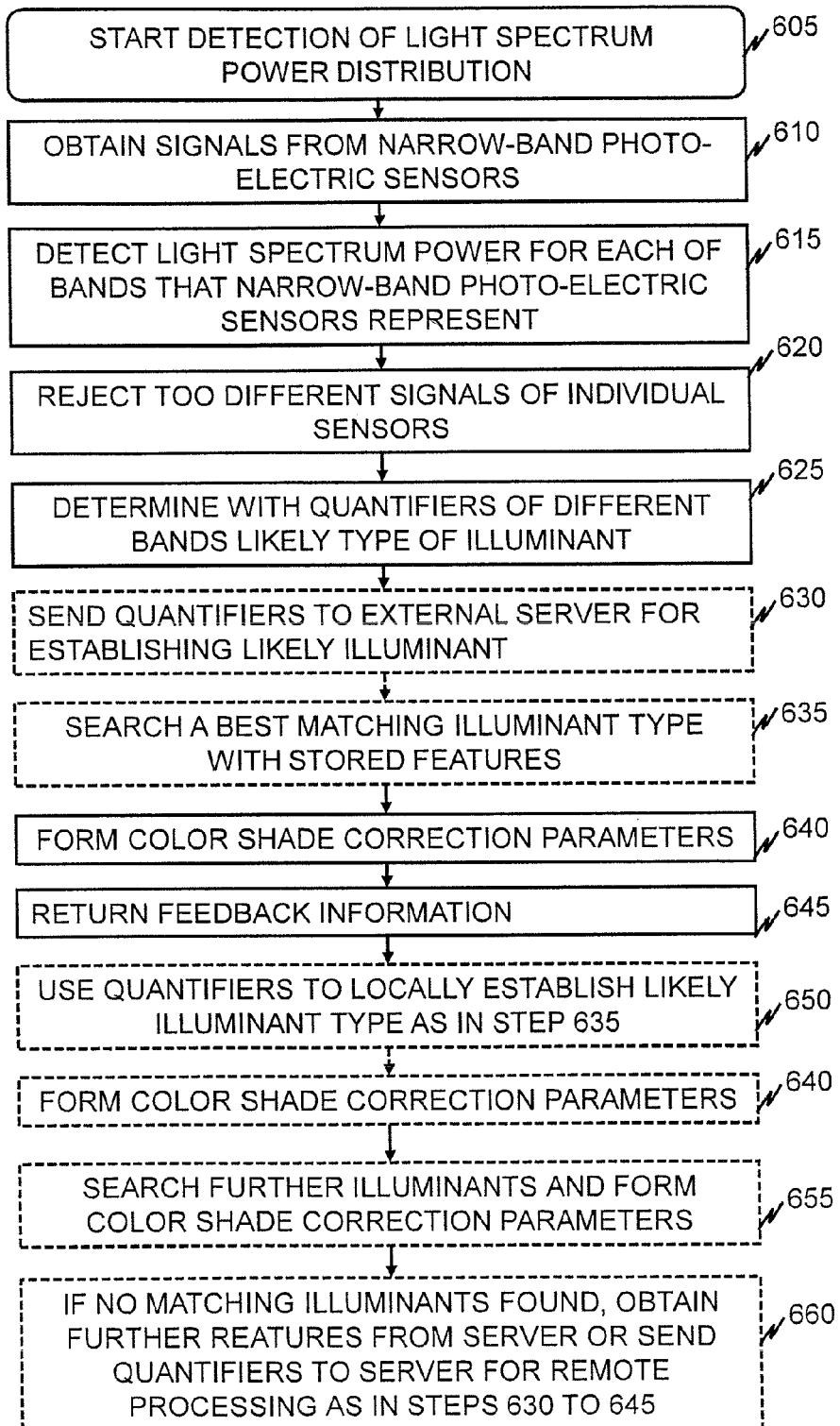
FIG. 6 shows a flow chart of a process according to an example embodiment of the invention.

FIG. 6 shows a flow chart of a process according to an example embodiment of the invention.

In step 605, the camera module is switched on or the detection of light spectrum power distribution is started. This starting can take place in response to a user command or automatically, e.g. on detecting from the level of ambient light that the image object is probably illuminated by using an artificial illuminant.

In step 610, signals are obtained from the narrow-band photo-electric sensors 520. Then, light spectrum power is detected 615 for each of the bands that the narrow-band photo-electric sensors 520 represent. For instance, with 10 nm wavelength bands, an average, total, square sum or other common quantifier is formed for each of the bands. In one example embodiment, signals from individual sensors 520 are rejected 620 if the difference over other sensors' signals exceeds a given tolerance threshold. This rejecting 620 can be used to reject particularly colored parts of an image for instance to avoid errors caused by specially colored objects in the image.

In step 625, the quantifiers of different bands are used to determine the likely type of illuminant. Color shade correction parameters are formed 640 (see description below) in the example embodiment in which only local operations are used.

In another example embodiment, the quantifiers are sent 630 to an external server at which the likely illuminant is established 635 by searching a best matching illuminant type with stored features. The server then forms 640 color shade correction parameters and return 645 as feedback e.g. the identity of the type of the illuminant and/or color shade correction parameters to the camera module 120 or to the apparatus with the camera module 120 or to other apparatus that makes use of the images taken by the camera module 120.

The features used for searching a likely illuminant type are, for instance, earlier formed quantifiers. The features may also be optimized for the searching of best matching. For instance, the features can be inverse values of corresponding features such that the search of the best match comprises multiplying all the quantifiers and all features of a candidate illuminant: the best matching illuminant results in a value closest to 1.

In another example embodiment, the quantifiers are used locally to establish 650 the likely illuminant type as in step 635. Color shade correction parameters are then formed 640 (as at the server in the foregoing paragraph) based on the stored features of the illuminant in question, if a matching illuminant is found. In one example embodiment, further other illuminant or illuminants are searched 655 and color shade correction parameters formed as in steps 635 and 640, if earlier found illuminants do not explain sufficient portion of the illumination as indicated by the quantifiers. For instance, each illuminant with a contribution exceeding a given illuminant threshold may be determined. The illuminant threshold may be set e.g. such that another illuminant is only determined if the share of the illuminant's light in the illumination exceeds 20 to 40 percent.

When further illuminants are found, the forming of color shade correction parameters results in such color shade correction parameters that describe the combined spectral effect caused by two or more illuminants. According to an example embodiment, if there are no stored features matching within given error with the quantifiers, further features are obtained 660 from the server or the quantifiers are sent to the server for processing as in steps 630 to 645.

The color shade correction parameters can be, for instance, multipliers with which measured powers of associated frequency bands can be multiplied. For such use, the color shade correction parameters are scaled around 1 so that a value 1 refers to no correction to be applied. In another embodiment, the color shade correction parameters are formed taking into account a measure of the brightness or exposure of images that are being formed. Then, the color shade correction parameters can be in the form of difference values that can be added with values of measured power of associated frequency bands. Various other forms of color shade correction parameters are also possible, such as polynomial, logarithmic or exponential color shade correction parameters, depending on the sensitivity curves of the pixel sensing elements 512, 514 & 518 and 516, for instance.

In an example embodiment, the color shade correction parameters determine for each band the relative power produced by the associated illuminant type. Thus, the same color shade correction parameters can be used by different camera units regardless of that how its frequency response is. For instance, one camera unit may have broader and more consistent band in which it measures blue light while another one may have narrower or more uneven frequency response. Armed with knowledge of the camera unit's 120 frequency response, the frequency bands of its pixel sensing elements 512, 514, 518, 516 bands and the color shade correction parameters, the signals produced by the pixel sensing elements 512, 514, 518, 516 are corrected 665 to rectify the color shading in produced images.

In another example embodiment, the forming 640 of the color shade correction parameters is readily targeted on the image capture unit 120 in question. In this case, the images can be color shade corrected by compensating signals of each of the of pixel sensing elements 512, 514 & 518 and 516 with the color shade correction parameters.

In an example embodiment, the color shade correction 665 is applied in video photography or in taking of serial images in rapid succession such that the color shade correction 665 is applied to each of the images, but the forming 640 of the color shade correction parameters is performed less frequently. The forming 640 of the color shade correction parameters can be also interrupted until a change in the colors of images taken by the image capture unit change to an extent that reaches a given re-computation threshold. Such interruption may help to reduce computation and power consumption of the device 110.

In an example embodiment, forming 640 of the color shade correction parameters is performed at a frequency greater than the frequency with which images are taken (either as serial still images or images for video footage). More frequent forming of the forming 640 of the color shade correction parameters may help in reacting to rapid changes in the ambient light e.g. caused by blinking lights (e.g. in a disco or rock concert).

Embodiments of the present invention may be implemented in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 3. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The invention claimed is:

1. An apparatus, comprising: a light spectrum power distribution detector comprising a plurality of narrow-band photo-electric sensors; wherein the sensors each have a given sensitive bandwidth within the frequency range of visible light, wherein the given bandwidth of at least two of the sensors is at least partially different, the number of the sensitive bandwidths being N, wherein N is greater than 3;
   wherein the sensors are interspersed on an image capture unit of a digital camera unit; and wherein the apparatus further comprises an output configured to output a signal indicative of the light spectrum power distribution as detected by the detector; and wherein:
   picture sensing elements of the image capture unit are arranged in groups of four in which there are two picture sensing elements sensitive for a first color and two other picture sensing elements each sensitive for second and third colors such that each group is capable of producing signals corresponding to three different colors; and most or all of the sensors are aligned with or in place of the picture sensing elements for the first color.

2. The apparatus of claim 1, wherein a plurality of the sensors share a common sensitive bandwidth.

3. The apparatus of claim 1, wherein N is 5 to 50.

4. The apparatus of claim 1, wherein the sensitive bandwidths are consecutive.

5. The apparatus of claim 1, wherein the sensitive bandwidths cover non-continuous parts of entire frequency range of visible light.

6. The apparatus of claim 5, wherein the sensitive bandwidths are set at such parts of the frequency range of the visible light where characteristic spectrum power peaks of particular illuminants reside.

7. The apparatus of claim 1, wherein the sensitive bandwidths are equally wide.

8. The apparatus of claim 1, wherein the sensors of common sensitive bandwidth are evenly distributed across the image capture unit.

9. The apparatus of claim 1, wherein the sensors are formed of individual picture sensing elements of the image capture unit.

10. The apparatus of claim 1, further comprising a defective picture sensing element memory for omitting signals from sensors in producing of digital images by the digital camera unit.

11. The apparatus of claim 1, further comprising an analyzer configured to determine what type of an illuminant is the source of light that arrives at the detector.

12. The apparatus of claim 1, wherein an analyzer is configured to determine color shade correction parameters for compensating uneven spectrum power distribution in images produced by the image capture unit.

13. A method comprising: detecting light spectrum power distribution by a detector comprising a plurality of narrow-band photo-electric sensors at locations interspersed on an image capture unit of a digital camera unit, each sensor having a given sensitive bandwidth within the frequency range of visible light, wherein the given bandwidth of at least two of the sensors is at least partially different; and producing a signal indicative of the light spectrum power distribution as detected by the detector;
wherein the number of the sensitive bandwidths is N and N is greater than 3; and wherein:
picture sensing elements of the image capture unit are arranged in groups of four in which there are two picture sensing elements sensitive for a first color and two other picture sensing elements each sensitive for second and third colors such that each group produces signals corresponding to three different colors; and most or all of the sensors are aligned with or in place of the picture sensing elements for the first color.

14. The method of claim 13, wherein a plurality of the sensors share a common sensitive bandwidth.

15. The method of claim 13, further comprising determining what type of an illuminant is the source of light that arrives at the detector.

16. The method of claim 13, further comprising determining color shade correction parameters for compensating uneven spectrum power distribution in images produced by the image capture unit.

17. A system comprising: an apparatus comprising: a light spectrum power distribution detector comprising a plurality of narrow-band photo-electric sensors; wherein the sensors each have a given sensitive bandwidth within the frequency range of visible light, wherein the given bandwidth of at least two of the sensors is at least partially different, the number of the sensitive bandwidths being N, wherein N is greater than 3; wherein the sensors are interspersed on an image capture unit of a digital camera unit; and wherein the apparatus further comprises an output configured to output a signal indicative of the light spectrum power distribution as detected by the detector; and a remote illuminant feature database; and wherein:
picture sensing elements of the image capture unit are arranged in groups of four in which there are two picture sensing elements sensitive for a first color and two other picture sensing elements each sensitive for second and third colors such that each group is capable of producing signals corresponding to three different colors; and most or all of the sensors are aligned with or in place of the picture sensing elements for the first color.

18. A computer program product comprising a non-transitory computer-readable medium bearing computer program code embodied therein for use with a computer, the computer program code comprising: code for detecting light spectrum power distribution by a detector comprising a plurality of narrow-band photo-electric sensors at locations interspersed on an image capture unit of a digital camera unit, each sensor having a given sensitive bandwidth within the frequency range of visible light, wherein the given bandwidth of at least two of the sensors is at least partially different; and code for producing a signal indicative of the light spectrum power distribution as detected by the detector; wherein the number of the sensitive bandwidths is N and N is greater than 3; and wherein:
picture sensing elements of the image capture unit are arranged in groups of four in which there are two picture sensing elements sensitive for a first color and two other picture sensing elements each sensitive for second and third colors such that each group produces signals corresponding to three different colors; and most or all of the sensors are aligned with or in place of the picture sensing elements for the first color.

* * * * *